United States Patent [19]

Darnell

[11] 4,431,330

[45] Feb. 14, 1984

[54] BALL JOINT IMPROVEMENT AND METHOD

[75] Inventor: Raymond E. Darnell, Fort Wayne, Ind.

[73] Assignee: Tuthill Corporation, Oak Brook, Ill.

[21] Appl. No.: 367,688

[22] Filed: Apr. 12, 1982

[51] Int. Cl.³ ............................................ F16C 11/06
[52] U.S. Cl. .................................. 403/122; 403/143; 403/144; 403/76; 29/441; 29/441 R
[58] Field of Search ............... 403/143, 122, 144, 141, 403/76, 77, 315, 316, 327, 137, 317, 124, 56; 29/441, 441 R, 149.5 B, 148 B

[56] References Cited

U.S. PATENT DOCUMENTS 3,514,138  5/1970  Davies et al. .......................... 403/77
3,803,685  4/1974  Muhn ............................... 29/149.5 B

FOREIGN PATENT DOCUMENTS 664713   4/1929   France ................................. 403/143
888057  12/1943   France ................................. 403/144
329749   5/1930   United Kingdom ............... 403/143

Primary Examiner—Andrew V. Kundrat
Assistant Examiner—Joseph A. Fischetti
Attorney, Agent, or Firm—George A. Gust

[57] ABSTRACT

The invention pertains to a ball joint assembly which includes a ball stud received in a swivel socket of a supporting body. Some of such assemblies are classed as quick disconnects, meaning that the ball stud may be conveniently assembled and disassembled as desired. In another class, the bodies are substantially cylindrical with the sockets forming a pair of diametrically opposed feather edges. In drilling the sockets, it is not uncommon for a burr to be formed about the perimeter, and for this burr to be bent inwardly thereby obstructing the free insertion of the ball stud into the socket. Also it is not uncommon for the feather edges to be bent inwardly resulting in the same problem. By counterboring the socket, the burr is removed and the feather edges are flattened which not only solves the obstruction problem but may also provide other advantages.

5 Claims, 13 Drawing Figures

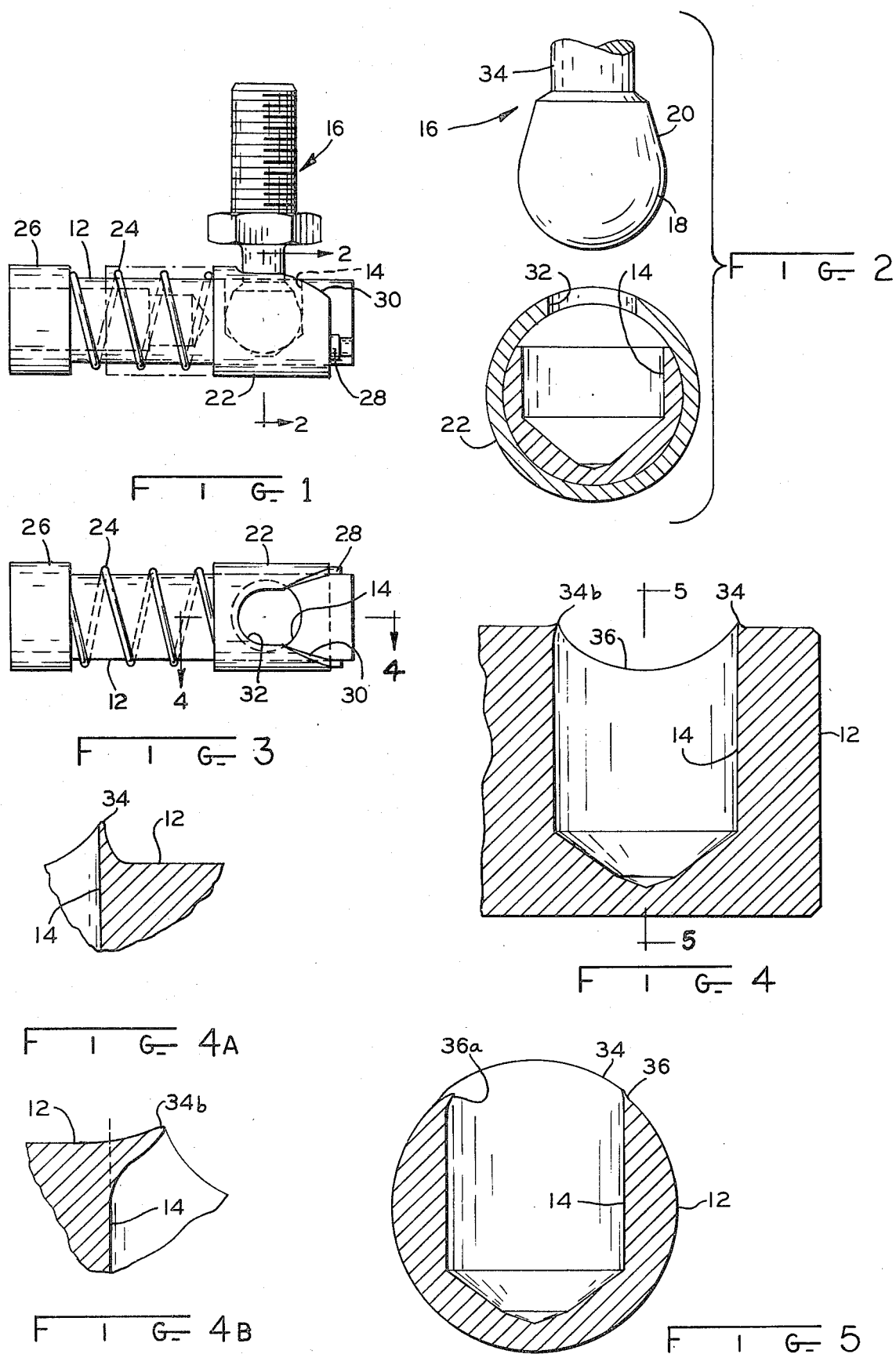

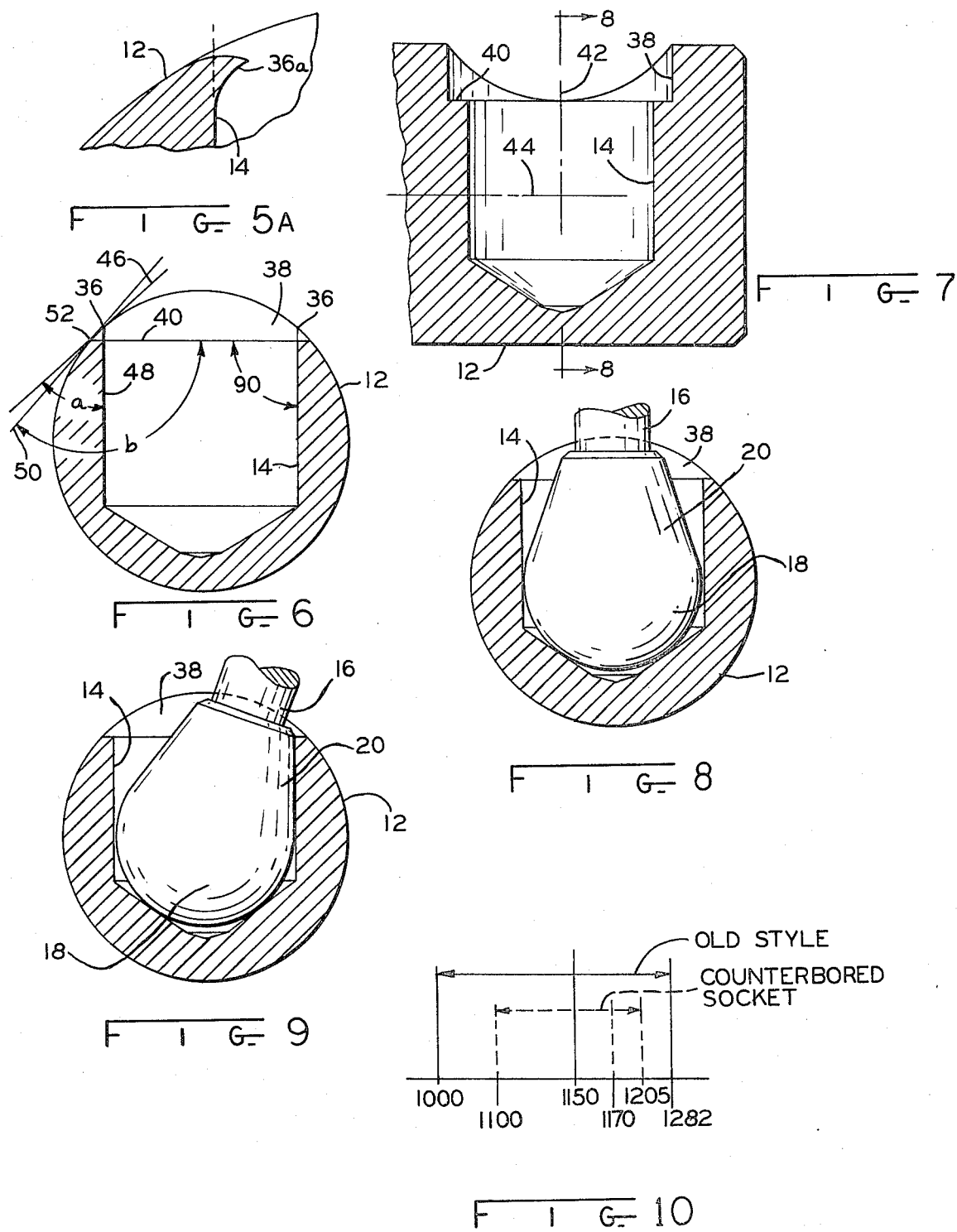

BALL JOINT IMPROVEMENT AND METHOD

BACKGROUND OF THE INVENTION

1. Field of the Invention

This invention relates to ball joints, and more particularly to improved ball joint assemblies of the quick disconnect and cylindrical body types.

2. Description of the Prior Art

Typical of both of the quick disconnect and cylindrical body type ball joint assemblies are those disclosed in U.S. Pat. No. 2,859,060. In this patent there is disclosed a stud member having a ball-shaped swivel element on one end which is adapted to be received in swiveling relation by a socket cross-drilled in a cylindrical supporting body. A moveable retaining sleeve is telescoped over the body for retaining the stud member assembled within the socket.

The supporting body is cylindrical and the socket is cross-drilled therein to a diameter such that relatively sharp, feather edges are normally formed at the perimeter of the socket on diametrically opposite sides thereof, such feather edges being formed at the intersection of the socket wall with the body surface.

In the manufacture of such assemblies, it not infrequently occurs that in drilling the socket, a small burr is formed either around the entire or a portion of the socket perimeter. During normal handling of such supporting bodies in bulk quantities or in the further processing thereof, such as in barrel plating, the drilling burr becomes peened or bent radially inwarding of the socket. The socket opening as a consequence becomes smaller such that the ball of the stud member sized to fit slidably into the socket now encounters the inturned burr as an obstruction. Insertion then becomes difficult, and in some instances leads to an increase in production time and expense. Further, it is not uncommon upon attempting to remove the stud, the ball encounters the obstruction causing inconvenience.

As explained hereinabove, feather edges are formed on opposite perimetral sides of the socket opening. During bulk handling and barrel plating, for example, these feather edges may also become peened or bent inwardly thereby resulting in the same type of obstructions. Still further, such feather edges being sharp may lead to weakened stress regions in the supporting body.

Different techniques were tried in solving the problem presented by the drilling burr, but none was found to be satisfactory. One of these was the use of abrasive in some form for grinding off the burr, and another was the use of a peening technique similar to shot peening. A third involved drilling the socket to a larger diameter or making the ball of the stud member smaller, but the dimensional tolerances resulting were too great. Also, tapering the socket was tried, but this also resulted in such a loose fit as to be unsatisfactory.

SUMMARY OF THE INVENTION

The present invention solves this problem in a manner which is the ultimate in simplicity and adds no cost to the manufacturing process. Simply stating, it involves counterboring the upper end of the socket which in effect cuts away the perimetral burr and/or feather edges. With the mouth of the socket therefore being larger, the insertion and withdrawal of the stud member is obstruction free.

Not only was the burr problem solved, but also it was discovered that controlling the counterboring by an amount which flattened the feather edges may result in greater tensile strength of the socket body thereby providing an unexpected advantage without increasing cost of manufacturing.

It is an object of this invention to provide an improved ball joint assembly wherein the ball of the stud member may be removably inserted into the socket of the supporting member without obstruction.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings,

FIG. 1 is a side view of a ball joint assembly of the quick disconnect type;

FIG. 2 is an exploded fragmentary section thereof taken substantially along section line 2—2 of FIG. 1;

FIG. 3 is a top view of the assembly of the retaining sleeve and supporting body with the stud member removed;

FIG. 4 is a fragmentary section taken substantially along section line 4—4 of FIG. 3;

FIGS. 4A and 4B are fragmentary enlarged views of those portions of FIG. 4;

FIG. 5 is a cross section taken substantially along section line 5—5 of FIG. 4;

FIG. 5A is a fragmentary enlarged view of a portion of the element of FIG. 5;

FIG. 6 is a cross section similar to FIG. 5 used in explaining certain of the principles of this invention;

FIG. 7 is a view like FIG. 4 but embodying the improvements of this invention;

FIG. 8 is a cross section taken substantially along section line 8—8 of FIG. 7 but with the ball of a stud member being inserted into the socket;

FIG. 9 is a view like FIG. 8 but with the stud member tilted to its maximum position; and FIG. 10 is a graph used in explaining certain of the properties of this invention.

DESCRIPTION OF THE PREFERRED EMBODIMENT

Referring to the drawings and more particularly to FIGS. 1, 2 and 3, the ball joint assembly illustrated is of the quick disconnect type, meaning that the stud member may be manually inserted into or withdrawn from the socket as desired. This basic design is fully disclosed and claimed in U.S. Pat. No. 2,859,060. A cylindrical supporting body 12 has a cylindrical socket 14 cross-bored therein, the relative diameters of the body 12 and socket 14 being substantially as shown. A stud member 16 is of conventional design and includes a ball shaped swivel portion 18 having a frusto-conical section 20. The diameter of the ball portion 18 substantially equals that of the socket 14 such that the two have a sliding, swivel fit.

For retaining the ball portion 18 within the socket 14, a retaining sleeve 22 is telescopically fitted over the body 12. A helical compression spring 24 is also fitted over the body 12 and bears at one end against the sleeve 22 and at the other end against an enlargement 26 on the end of the body 12. The opposite end of the body 12 may be staked to provide an abutment 28 which prevents the sleeve from being pushed off the body 12 by means of the spring 24.

As shown more clearly in FIG. 3, the sleeve 22 is provided with a wedge shaped notch 30 having a part circular portion 32 of a diameter smaller than that of the socket 14 but large enough to pass around the neck portion 34 of the stud member 16. The sleeve 22 may be moved toward the left to the dashed line position shown in FIG. 1 thereby fully exposing the socket 14. The ball portion 18 of the stud member is then inserted into the socket 14 following which the sleeve 22 is released permitting the spring 24 to move the sleeve 22 into captive engagement with the neck portion 34 of the stud member. Since the portion of the sleeve 22 is registry with the socket opening 14 is of smaller diameter than the ball portion 18, the stud member is thus locked into place. However, since the sleeve 22 is moveable on the body 12, any tilting movement of the stud member 16 is accommodated.

Referring to FIGS. 4 through 5A, it is there shown that upon drilling the socket 14, a drilling burr 34 is formed around the socket mouth or perimeter. This burr may be as much as a 1/32nd of an inch in height but will vary depending upon the sharpness of the drill being used. In any event, since production quantities of the drilled bodies 12 are mass produced, it is conventional for them to be collected in trays or barrels in large numbers such that it is not uncommon for bodies thrown or otherwise dumped into such containers to engage forcefully or hammer against one another. In so doing, some of the burrs 34 are contacted and peened or bent over radially inwardly of the socket 14 as indicated by the numeral 34b, and if this peening is of the entire burr, an inner rim surrounding the socket perimeter will thus be produced. This same peening or bending can result from barrel-type, metal plating in which the bodies 12 are tumbled for a relatively long period of time.

Now if it is attempted to insert the ball 18 of the stud member 16 into the socket 14, it will at once be noted that the bent over burr 34b will constitute an obstruction. The strength and size of this obstruction will determine how difficult it is to insert the ball into the socket. The same applies to withdrawal of the ball from the socket, since the ball portion 18 contacts the burr in the same manner as for insertion. In some instances it has been found that a tool, such as a pair of pliers or mallet, is required for inserting and withdrawing the stud member thereby defeating the objective of the quick disconnect feature of the assembly.

Even though a burr 34 may not be formed, since the socket 14 is drilled into the side of the body 12 which is cylindrical, relatively sharp, feather edges will be formed on diametrically opposite sides of the socket opening as indicated by the numeral 36. During bulk handling, barrel plating or the like, such feather edges 36 can be bent inwardly of the socket 14 as indicated by the numeral 36a. Such bent over portions 36a thus become obstructions to the removable insertion of the ball stud into the socket 14.

The problems posed by the bent over burrs 34b and feather edges 36a are easily solved by counterboring the socket 14 as indicated by the numeral 38, the counterbore 38 being to a depth which cuts off the feather edges 36 and produces instead an annular shaped flattened portion of shoulder 40 which surrounds the mouth of the socket 14. The size of this flat in radial dimension may be made to about 0.015 inches for a body diameter of about 0.436 inches and a socket diameter of about 0.350 inches. This may be accomplished by making the counterbore 38 to a diameter of about 0.380 inches.

Preferably, the shoulder 40 is flat and defines a plane at right angles to the axis 42 of the socket 14, this axis also being perpendicular to the axis 44 of the body 12. The depth of the socket 14 in this working embodiment is as shown in FIGS. 8 and 9 as will assure engagement along the full extent of the frusto-conical portion 20 with the wall of the socket 14, as shown in FIG. 9, when the stud member 16 is tilted to the extreme. This arrangement is the preferred; however, for some sizes of ball and sockets, the wall of the socket may be slightly shallower than shown. Nevertheless, full engagement between the ball and socket sides is still achieved. This serves in providing maximum strength in the parts so engaged as a stop against further tilting of the stud member 16.

By counterboring, the drilling burr 34 will be cut off as will be the feather edge 36. This results in the socket 14 being unobstructed such that the ball portion 18 of the stud member may be easily inserted and withdrawn.

While providing such counterbore solves the problem of the drilling burr and feather edge becoming an obstruction, an unexpected benefit may be derived therefrom which is in the form of increased tensile strength of the body 12 in the region of the socket 14. This is explained by reference to FIGS. 6 and 10. The feather edge 36 is relatively sharp and may be characterized by an angle "a" (FIG. 6) formed between the tangent 46 and the side 48 of socket 14. By comparison, the angle "b" (FIG. 6) formed between the plane of shoulder 40 and the tangent 50 is a great deal larger, this tangent 50 coinciding with the intersection 52 between the plane of shoulder 40 and the body surface. Since the feather edge 36 is defined by a small angle "a" and is sharp, a region of localized stress with consequent structural weakness is produced. By converting this sharp feather edge 36 to the flattened ledge or shoulder 40, the localization of stress is spread out over a corresponding area thereby providing greater strength in the region. There are actually two such regions, these being on diametrically opposite sides of the socket 14.

Actual tests reveal that the mean tensile strength of the body may be enhanced by reason of the presence of the counterbore 38. These tests were conducted on ten different samples, each of the assemblies in a category having feather edges 36 and the counterbores 38, respectively. A cylindrical stud member was used instead of the ball stud 16 and a force was applied to this stud and to the supporting body in a direction longitudinally of the latter up to the point of failure. At failure, cracks would appear on diametrically opposite sides of the socket opening or in other words at the locations of the feather edges. FIG. 10 shows the results of these tests wherein, for the old style body having the feather edges 36, the load ranges extended from 1000 pounds to 1282 pounds but for the counterbored version as denoted in FIGS. 7 through 9, from 1100 to 1205 pounds. The mean strength of the feather edge style was calculated in this test run to be at 1150 pounds with the mean strength of the counterbored style to be 1170 pounds indicating the counterbored version to be stronger. It should be observed that a reduction in the range of ultimate failure load of the socket by approximately 60% has been achieved through counterboring the cavity.

While there have been described above the principals of this invention in connection with specific apparatus, it is to be clearly understood that this description is made only by way of example and not as a limitation to the scope of the invention.

What is claimed is:

1. For use in a ball joint assembly, a body having a generally cylindrical socket which opens through one side thereof, said body further having a radially inset shoulder surrounding the perimeter of said socket, said shoulder intersecting the wall of said socket and thereby defining a socket opening for receiving the ball of a ball stud, said body being at least of part cylindrical shape, said socket having at least a portion thereof which opens through a cyclindrical portion of said body, said shoulder lying in a plane that intersects the surface of said cylindrical portion, said plane intersecting the axis of said socket substantially at right angles, said shoulder being the bottom of a counterbore in the outer portion of said socket.

2. The body of claim 1 in combination with a stud member having a portion thereof which slidably fits within said socket, said portion of said stud member being round and of smaller diameter than said counterbore.

3. The combination of claim 2 wherein said body is of elongated cylindrical shape, the axis of said socket intersecting the axis of said body substantially at right angles, the perimeter of the counterbore opening lying within the cylindrical surface of said body, said portion of said stud member being ball shaped.

4. The combination of claim 3 wherein said ball shaped portion has a frusto-conical section, the depth of said socket as measured from the bottom to said shoulder being substantially coextensive with the length of one side of said ball shaped portion whereby said frusto-conical section may lie flat against the wall of said socket when said stud member is tilted a maximum to one side.

5. The combination of claim 3 including a retaining sleeve telescopically received over said body, said sleeve having a portion which partially overlies said socket to thereby retain said ball shaped portion of said stud member therein, said sleeve being movable out of overlying relation with said socket thereby to release said stud member for withdrawal from said socket.

* * * * *